United States Patent Office 3,781,344
Patented Dec. 25, 1973

3,781,344
PROCESS FOR MANUFACTURING TEREPHTHALIC ACID BY OXIDATION OF PARA-XYLENE
Jacob Alagy, La Celle-St.-Cloud, and Christian Busson, Rueil-Malmaison, France, assignors to Institut Francais du Petrole, des Carburants et Lubrifiants, Rueil-Malmaison, France
No Drawing. Filed May 1, 1972, Ser. No. 248,803
Claims priority, application France, May 6, 1971, 7116492
Int. Cl. C07c 63/02
U.S. Cl. 260—524 R       9 Claims

ABSTRACT OF THE DISCLOSURE

A process for manufacturing terephthalic acid comprises oxidizing para-xylene in liquid phase, recovering the resulting terephthalic acid, concentrating the recovered liquid phase, washing the same with water, separating the solid by-products from the liquid phase and recycling the liquid phase to the oxidation reactor.

The process may be used over long periods without a substantial yield decrease.

---

This invention concerns an improved process for manufacturing terephthalic acid by oxidation of para-xylene.

A known process consists of oxidizing para-xylene dissolved in an aliphatic monocarboxylic acid, for example acetic acid and its homologues with molecular oxygen, at a temperature usually between 80 and 200° C., in the presence of a heavy metal catalyst.

Para-xylene is first converted to para-toluic acid which, if the oxidation is continued, is converted to terephthalic acid. Processes of that type are described, for example, in U.S. Pat. 2,245,528 and in French Pats. Nos. 1,504,431 and 1,504,432.

According to the known processes for oxidizing para-xylene to terephthalic acid, in the liquid phase, a molecular oxygen containing gas such as air is passed through a solution of para-xylene in a monocarboxylic acid containing a catalyst. The resulting terephthalic acid appears as a solid dispersed throughout the reaction mixture. It is separated from the outflow of the reaction zone by filtration, centrifugation, or any other convenient means. The recovered liquid, which contains catalyst, since the latter is dissolved in the monocarboxylic acid, is at least partly fed back to the oxidation zone. However the recovered liquid is discolored by organic by-products which have been formed during the reaction. Since at least a part of the liquid phase is recycled to the oxidation zone, the organic impurities grow progressively troublesome since they inhibit the reaction, discolor the resulting terephthalic acid and interfere with the catalyst, which results in a decrease in yield.

It has now been found that if at least a portion of the liquid phase obtained after recovery of terephthalic acid is purified by a specific process, before being recycled to the oxidation reactor, on the one hand, the catalyst is recovered in a clean condition with a high yield and, on the other hand, as the organic impurities have been removed in major proportion, no further appreciable decrease of the terephthalic acid yield is observed.

The purification process of this invention differs from the known processes in that no portion of the recycled liquid is separated and rejected, and no extraction of a portion of the organic impurities of this liquid by a selective solvent takes place. According to this process, the organic impurities are caused to settle by adding water and at least a part of the liquid phase is recycled after filtration of the solid organic impurities.

However, the purification process of this invention may be operated only if the liquid phase to be purified contains from about 10 to about 50% and preferably from about 15 to 45% by weight of aliphatic monocarboxylic acid. Since the liquid phase usually contains more than 50% of monocarboxylic acid, it is then necessary to distill under atmospheric pressure or under reduced pressure a portion of the monocarboxylic acid, before the treatment according to the invention; this carboxylic acid may be advantageously recycled to the oxidation vessel. If the organic phase contains more than about 50% by weight of carboxylic acid, the organic impurities do not settle quantitatively when water-treating, and a portion of these impurities will thus go back to the reactor; on the contrary, if the liquid phase contains less than about 10% by weight of carboxylic acid, the yield of the catalyst recovery will be low as a consequence of the high viscosity of the liquid phase subjected to water-treating.

Moreover, the purging process of this invention yields satisfactory results only when the weight of water used for settling the organic impurities is about 1 to 10 times, preferably about 1.5–5 times and more preferably 2–3 times the weight of the liquid phase containing from about 10 to about 50% by weight of monocarboxylic acid. The good results obtained by this process are thought to be attributable, among other reasons, to the fact that water, when used for settling organic impurities, forms an homogeneous phase with the aliphatic monocarboxylic acid of the liquid phase.

Under usual conditions, the settling of the organic impurities is generally obtained by stirring the mixture of water and liquid phase, for example under normal pressure and at a temperature essentially in the range of from about 10 to about 40° C., and preferably from 15 to 30° C.

Thus the process of this invention may be defined as follows: when solid terephthalic acid has been separated from the liquid outflow from the reactor, at least a fraction thereof (at least about 2% and preferably at least about 4% by volume, the remaining portion or a part thereof being, if so desired, directly recycled to the reactor) is concentrated by partial distillation in order that its content of the monocarboxylic acid used as solvent in the oxidation step be lowered to a value of about 10–50% and preferably about 15–45% by weight, at least a portion of the resulting new liquid outflow is treated at about 10–40° C. and preferably 15–30° C. with water in an amount of about 1–10 times and preferably about 1.5–5 times the weight of the new liquid outflow, then, after removal of the solid products formed when contacting the new outflow with water, at least a portion of the resulting solution is fed back to the oxidation reactor.

If the amount of water used during the treatment of this invention is high, it is advantageous to eliminate at least a part of this water by any convenient process such as distillation before recycling the purified solution to the reactor.

The conditions under which xylene may be oxidized are known and require no detailed description.

However, it is to be recalled that a transition metal salt may be used as oxidation catalyst, preferably a cobalt or manganese salt, for example cobalt acetate, cobalt propionate, cobalt oleate, manganese naphthenate, cobalt bromide or manganese bromide, or a mixture thereof.

The oxidation catalyst may be used, for example, at a rate of from 0.01 to 50 and preferably from 0.01 to 5 parts by weight per part by weight of para-xylene.

Known initiators may also be used, for example olefines, ethers, ketones, aldehydes, peroxides and the like, bromine or bromine ions releasing compounds, for example hydrobromic acid.

Oxygen may be used diluted in an inert gas, for example, as air.

The solvent of paraxylene is a mono-carboxylic acid containing, for example, 2–8 carbon atoms. Acetic acid is preferred. For example 1–20 parts and preferably 2–10 parts by weight of carboxylic acid are used per part by weight of paraxylene.

The general conditions of the reaction comprise a temperature of about 80–200° C. and a pressure usually higher than normal pressure, for example 2–30 kg./cm.$^2$.

The following examples are given for illustrative purposes. Examples 1A, 1B, 1C, 1D and 2A are given by way of comparison.

EXAMPLE 1

4.5 kg./hour of paraxylene, 50 kg./hour of acetic acid, 0.31 kg./hour of hydrobromic acid, 0.51 kg./hour of cobalt acetate tetrahydrate and 20 m.$^3$/hour of air at 0° C. and 760 mm. Hg are continuously introduced into a reaction vessel. The temperature is 150° C. and the pressure 10 atmospheres. The conversion rate is 99%.

The reactor outflow, which contains 6.7 kg./hour of terephthalic acid is filtered; terephthalic acid is washed with acetic acid. The washing liquors are fed back to the reactor. 5% by volume of the filtered solution are treated as follows, the remaining 95% being fed back to the reactor: they are partially distilled so as to obtain a distillation residue containing 30% by weight of acetic acid. The distillate is recycled to the oxidation reactor.

The residue is analyzed; it contains, by weight, 30% of acetic acid, 2% of water, 2% of 4-carboxy benzaldehyde, 4% of para-toluic acid, 4% of benzoic acid, 1% of terephthalic acid, 8% of bromine compounds, 3% of cobalt compound and 46% of organic impurities.

This distillation residue is contacted with water and stirred for 15 minutes at 20° C. and atmospheric pressure.

Table I summarizes the rates of recovery of the bromine and cobalt compounds as a function of the amount of water used for treating the residue. It is found that the highest recovery rates (experiments No. 3 to 6) are obtained when the residue is treated with about 2 to 3 times its weight of water.

When using this preferred water ratio (experiments Nos. 3 to 6), the organic impurities, the undesired organic acids, and 4-carboxy benzaldehyde settle. By filtration, there is recovered a filtrate containing acetic acid, water, higher or lower trace amounts of benzoic acid and organic impurities, and the bromine and cobalt compounds. Said filtrate is fed back to the oxidation reactor after removal of a part of water by distillation.

When operating continuously according to the above process, it is found that, after 300 hours, the conversion is about 99%.

TABLE I

| Experiment | Percent water by weight with respect to the residue | Recovery rate, percent of— | |
|---|---|---|---|
| | | Bromide compound | Cobalt compound |
| 1 | 0.5 | 42.3 | 55.6 |
| 2 | 1 | 72.7 | 82.5 |
| 3 | 1.6 | 85.1 | 95.2 |
| 4 | 2 | 86.2 | 96.7 |
| 5 | 3 | 86.8 | 96.5 |
| 6 | 4.5 | 87.1 | 97.3 |
| 7 | 10 | 80.4 | 91.8 |
| 8 | 12 | 60.2 | 71.5 |

EXAMPLE 1A

Experiment 4 of Example 1 is repeated except that the residue is treated by water at 0° C. instead of 20° C.

The bromine compound is recovered at a rate of only 76.5% and the cobalt compound at a rate of only 78.3%.

EXAMPLE 1B

Experiment 4 of Example 1 is repeated except that the residue is treated by water at 50° C. instead of 20° C. The bromine compound is recovered at a rate of only 78.3% and the cobalt compound at a rate of only 81.2%.

EXAMPLE 1C

Experiment 4 of Example 1 is repeated; however, after filtration of the terephthalic acid, the solution is partially distilled in order that it contain only 5% by weight of acetic acid instead of 30%.

The residue obtained, which thus contains 5% of acetic acid, is washed with two times its weight of water, for 15 minutes at 20° C. under atmospheric pressure.

The bromine compound is recovered with a yield of only 67.5% and the cobalt compound with a yield of only 70%.

EXAMPLE 1D

Experiment 4 of Example 1 is repeated; however, after filtration of terephthalic acid, the solution is partially distilled in order that it contain 70% by weight of acetic acid. The residue obtained, which thus contains 70% by weight of acetic acid, is treated with two times its weight of water for 15 minutes at 20° C. under atmospheric pressure. After this treatment, the filtrate obtained is highly colored and contains 20% by weight of organic impurities which will thus be recycled to the reactor. When working continuously, it is found that the initial conversion of more than 99% falls to 95% after 200 hours and 80% after 300 hours. After 400 hours, occlusions occur in the pipes, which may be attributed to the settling of paratoluic acid, so that the operation must be stopped.

EXAMPLE 2

15 kg./hour of paraxylene, 1.5 kg./hour of cobalt acetate, 1 kg./hour of hydrobromic acid and 150 kg./hour of acetic acid are continuously introduced into a reactor. The reaction temperature is 140° C. and a stream of air is passed therethrough at a rate of 60 m.$^3$ per hour. The reaction mixture is filtered and 22.8 kg./hour of terephthalic acid are obtained. 10% of the recovered solution are distilled so that they contain only 30% by weight of acetic acid. Then it is treated by 2 times its weight of water in a stirred reactor for 15 minutes at room temperature (20° C.) and atmospheric pressure. The outflow is filtered to eliminate the organic impurities which have settled. The filtrate is fed back to the oxidation reactor after the removal of 50% by weight of the water present. The remaining 90% of the untreated catalytic solution is directly fed back to the reactor.

The weight of terephthalic acid is given in Table II as a function of time.

TABLE II

| Length of run (hours): | Terephthalic acid obtained in kg. per hour |
|---|---|
| 100 | 22.6 |
| 500 | 22.9 |
| 1000 | 22.65 |
| 2000 | 22.7 |
| 5000 | 22.8 |

EXAMPLE 2A

Example 2 is repeated, except that the solution recovered after the filtration of terephthalic acid is not treated: thus this solution is directly fed back to the oxidation reactor without any purge thereof. The weight of terephthalic acid is given in Table III as a function of time.

TABLE III

| Length of runs (hours): | Terephthalic acid obtained in kg. per hour |
|---|---|
| 100 | 22.8 |
| 500 | 18.2 |
| 1000 | 11.5 |

After 1,000 hours of run the reaction is so strongly inhibited that the reaction no more proceeds.

What is claimed is:

1. In a process for manufacturing terephthalic acid, comprising oxidizing para-xylene in a liquid phase in a reaction zone by means of a molecular oxygen containing gas, in an aliphatic mono-carboxylic acid, at a temperature of from about 80° C. to about 200° C., at a pressure of from about 2 to about 30 kg./cm.², in contact with a transition metal compound, wherein solid terephthalic acid is separated from the liquid outflow of the reactor, and at least a portion of resultant separated liquid outflow is recycled to the reaction zone, the improvement in the separating and recycling steps of: (a) concentrating at least about 2% by volume of the resultant separated liquid outflow, by partial distillation in order that its content of aliphatic monocarboxylic acid, used as solvent in the oxidation step, be decreased to a value of about 10–50% by weight; (b) treating at least a portion of the thus obtained concentrated liquid outflow with water at a temperature of from 10 to 40° C., to form a homogeneous phase with said monocarboxylic acid, the amount of water being about 1–10 times the weight of said concentrated liquid outflow; (c) separating from resultant aqueous homogeneous solution solid products formed during said treatment with water; and (d) recycling at least a fraction of the resultant separated aqueous solution to the oxidation reactor.

2. A process as defined by claim 1, wherein the monocarboxylic acid contains 2–8 carbon atoms.

3. A process as defined by claim 1, wherein the transition metal compound is a cobalt or manganese salt.

4. A process as defined by claim 2, wherein the transition metal compound is a cobalt or manganese salt.

5. A process as defined by claim 1, wherein said resultant separated aqueous solution in Step (d) is distilled to remove water prior to being recycled to the oxidation reactor.

6. A process according to claim 1, wherein at least a portion of the liquid outflow, separated from the solid terephthalic acid, is concentrated to such an extent that its aliphatic mono-carboxylic acid content is decreased to about 15–45% by weight.

7. A process according to claim 1, wherein the treatment with water is carried out at 15–30° C.

8. A process according to claim 1, wherein water is used in an amount of 1.5–5 times the weight of said concentrated outflow.

9. A process according to claim 1, wherein the monocarboxylic acid is acetic acid.

References Cited
UNITED STATES PATENTS
2,833,816  5/1958  Saffer et al. _____ 260—524

LORRAINE A. WEINBERGER, Primary Examiner

R. S. WEISSBERG, Assistant Examiner